INVENTORS
Robert C. Beckwith, &
Robert W. Hecker, Jr.
BY Bernard, McGlynn & Reising
ATTORNEYS June 23, 1970  R. W. HECKER, JR., ET AL  3,516,103

DOCKBOARD

Filed May 8, 1968  2 Sheets-Sheet 2

INVENTORS
Robert C. Beckwith, &
BY Robert W. Hecker, Jr.

Bernard J. McGlynn & Reising
ATTORNEYS

United States Patent Office 3,516,103
Patented June 23, 1970

3,516,103
DOCKBOARD
Robert W. Hecker, Jr., Clare, Mich., and Robert C. Beckwith, Milwaukee, Wis., assignors to Loomis Machine Company, Clare, Mich., a corporation of Michigan
Filed May 8, 1968, Ser. No. 727,561
Int. Cl. B65g *11/00*
U.S. Cl. 14—71
15 Claims

ABSTRACT OF THE DISCLOSURE

A dockboard for a loading dock including a support structure with a ramp pivotally connected to the support structure for movement between a raised position and dock level or cross traffic position where traffic may move between the dock and a vehicle disposed adjacent the dock. A cam is rotatably connected to the ramp and a lift arm is pivotally attached to the support structure. A roller is rotatably connected to the lift arm and engages the cam. Springs are attached to the lift arm for biasing the lift arm to pivot upwardly. A handle is operatively supported on the ramp and rotates a rod having a crank arm on the end thereof. The crank arm engages the cam for rotating the cam upon movement of the handle. The cam has a peripheral configuration for coacting with the roller so that the springs acting through the lift arm will raise the ramp upwardly from the cross traffic position when the handle is rotated to rotate the cam. The forces applied by the springs are not sufficient, however, to raise the ramp when in the cross traffic position unless the cam is rotated.

---

Dockboards of the type to which the instant invention pertains are normally utilized in conjunction with a loading dock to facilitate the free movement of traffic between the loading dock and the bed of a truck, a railroad car, or the like. Loading docks normally have fixed heights, however, trucks, railroad cars, and the like, utilize beds or platforms which are at various different heights. Furthermore, the bed height of a truck, or the like, is lower when the truck is fully loaded than when the truck is empty so that the bed will rise upon removal of articles from the truck. Trucks, railroad cars, and the like, are often loaded or unloaded by persons passing back and forth between the vehicle and the loading dock. More frequently, such vehicles are loaded or unloaded by use of fork lift trucks which are driven between the loading dock and the bed of the vehicle.

Dockboards normally include a ramp pivotally connected to a support structure which is either independent of or forms an integral part of the loading dock such that the ramp may be pivoted to a cross traffic position where its outer end contacts the bed of a vehicle to be loaded or unloaded. For example, a truck may be backed into position adjacent a loading dock with a dockboard pivoted to a dock level position where the outward end of the ramp contacts the bed of the truck so that people and/or forklifts may pass between the loading dock and the bed of the truck to either load or unload the truck. The dockboards which have heretofore been utilized employ various actuating mechanisms to aid in or to actually pivot the ramp of the dockboard between a raised position and a dock level position. One such actuation mechanism is a very costly and complex motor drive assembly which is manually controlled by switches, levers, or the like. These motors are frequently electric motors controlled by push buttons to drive gears, chains, and the like. Other dockboards utilize numerous different mechanical linkage systems for pivoting the ramp. However, these systems do not in and of themselves move the ramp but rather aid in the manual movement of the ramp and, therefore, are incapable of pivoting the ramp without a source of outside energy.

This problem has in part been solved by a dockboard which includes a lip pivoted to the distal or outward end of the ramp for pivotal movement between an extended cantilevered position and a pendent position. This dockboard includes a lift arm pivotally connected the support structure and biased to pivot upwardly by springs. A rotatable cam is connected to the ramp and a linkage means operatively interconnects the lip and the cam. The ramp has a storage position where it is substantially horizontal and at dock level with the lip depending therefrom and engaged in a support means so that traffic may pass along the dock and over the ramp. The ramp must be manually pivoted upwardly in preparation for use. During this upward movement the roller, which engages the cam and is supported by the lift arm, rotates the cam and the cam engages the linkage means connected to the lip to thereby raise the lip from the pendent position to the extended cantilevered position. When the cam has thus been rotated far enough, the linkage means moves to a locked position to lock the lip in the extended cantilevered position. In this dockboard construction, the ramp is always automatically returned to the dock level position for storage and the ramp is disposed in a recess in the dock. It is frequently necessary, however, to utilized a ramp which is disposed on the front edge of a dock and extends in a cantilevered fashion therefrom when in the dock level or cross traffic position. This ramp is then stored in the vertical position when not in use so as to allow room for traffic to move along in front of the dock. Such dockboards have the disadvantage of requiring the ramp to be manually moved between the in use dock level position and the vertical upright storage position.

Accordingly, it is an object and feature of this invention to provide a dockboard of the type which moves between a vertical stored position and a generally horizontal dock level position and includes a mechanical linkage means which may be actuated so that the ramp will automatically pivot from the lowered dock level position to the vertical stored position.

In correlation with the foregoing object and feature another object and feature of this invention is to provide a dockboard including a ramp which is pivotally connected to the support structure with a lift arm pivotally connected to the support structure and supporting a roller which coacts with a cam rotatably supported by the ramp and rotated by an actuation means so that upon rotation of the cam while the ramp is in the substantially horizontal position, the ramp will be pivoted toward the vertical storage position by the lift arm yet the lift arm will not pivot the ramp unless the cam is rotated by the actuation means.

Other objects and attendant advantages of the present invention will be readily appreciated as the same becomes better understood by reference to the following detailed description when considered in connection with the accompanying drawings wherein.

Figure 2:
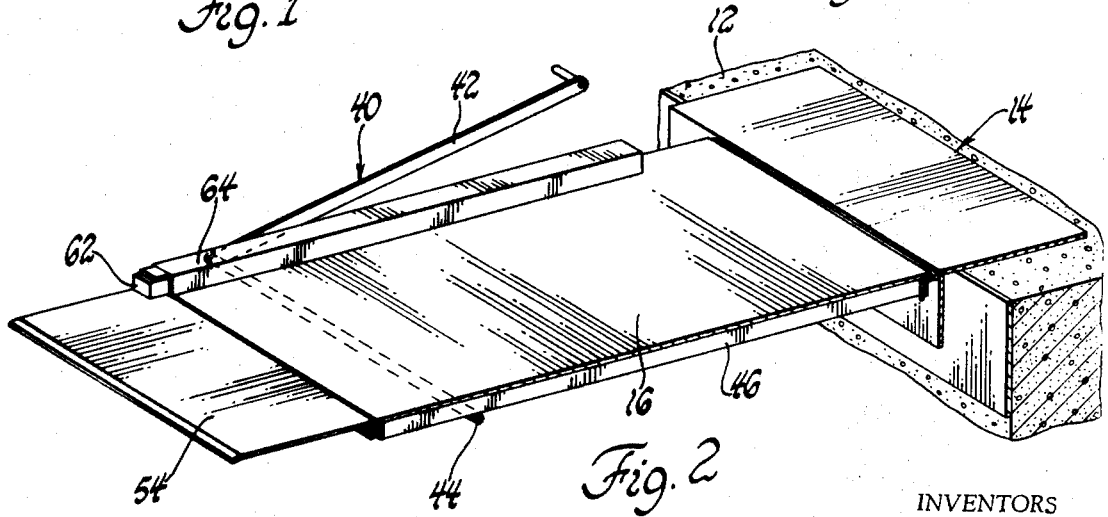
FIG. 2 is a fragmentary cross-sectional perspective view of the preferred embodiment.

Referring now to the drawings wherein like numerals indicate like or corresponding parts throughout the several views, a dockboard constructed in accordance with the instant invention is generally shown at 10. The dockboard is for use with a loading dock 12. The loading dock 12 is usually made of cement and the dockboard 10 is usually attached to the front edge of the dock 12. The dockboard 10 includes a support structure which is generally indicated at 14 and secured to the cement dock 12. A ramp or ramp structure 16 is pivotally connected to the support structure by the mounts 18 for movement between a raised vertical storage position, as illustrated in FIG. 3, and a cross traffic position as illustrated in FIGS. 2 and 4.

A cam 20 and lift means generally indicated at 22 operatively interconnect the ramp 16 and the support structure 14. The cam 20 is rotatably supported on the ramp 16 by the pin 24 and the plates 26.

The lift means 22 engages the cam 20 for applying a force to the cam 20 to pivot the ramp 16. More specifically, the lift means 22 includes a lift arm 28 pivotally connected to the support structure by the pin 30. The springs 32 are connected at one end to the lift arm 28 through the shaft 34 and have the other ends connected adjacent the pivotable connection 18 between the ramp 16 and the support structure 14. As illustrated, the springs 32 are connected to the ramp 16 through the projections 36, however, it will be understood the springs 32 may also be connected directly to the support structure 14 in the area adjacent the pivotable connection 18. A roller 38 is rotatably supported by the lift arm 28 and engages the cam 20.

Figure 1:
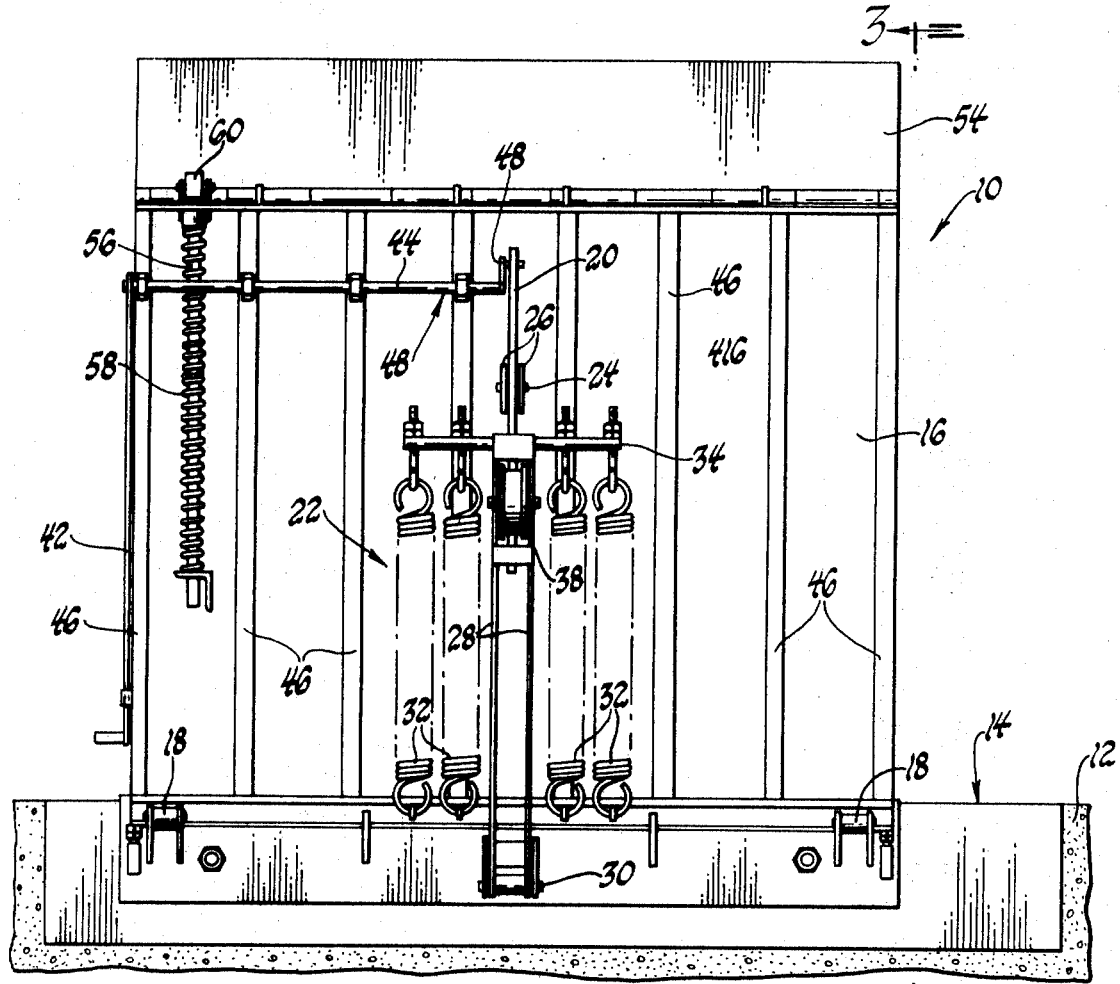
FIG. 1 is a front elevational view of a preferred embodiment of the instant invention.
Figure 3:
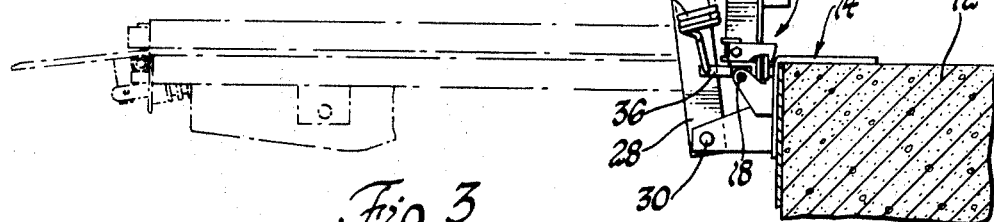
FIG. 3 is a view taken substantially along line 3—3 of FIG. 1 and showing the generally horizontal cross traffic or dock level position in phantom.
Figure 4:
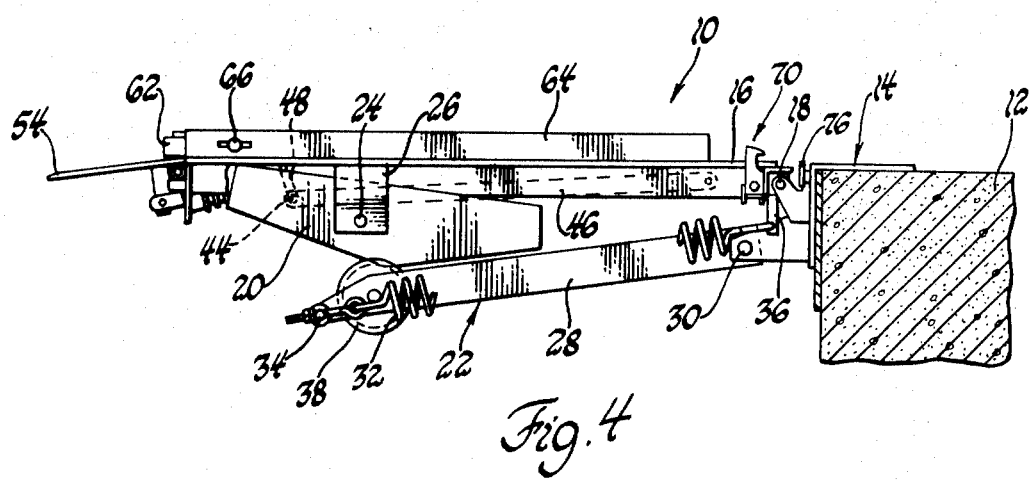
FIG. 4 is a cross-sectional side view showing the dockboard in the generally horizontal cross traffic or dock level position.

The dockboard 10 also includes an actuation means which is generally indicated at 40 and is selectively operable for rotating the cam 20 between a first position, as illustrated in FIG. 4, and a second position, as illustrated in FIG. 3, when the ramp is in a fixed position such as the cross traffic position illustrated in FIG. 4. More specifically, the actuation means is supported by the ramp 16 and includes a manually graspable handle 42. There is also included a rod 44 rotatably supported by the ramp 16 and extending between one side thereof and the cam 20. As illustrated, the ramp 16 includes the strengthening beams 46 and the rod is rotatably supported across a plurality of these strengthening beams 46. The handle 42 is attached to the rod and extends transversely relative thereto. It will be noted that the handle 42 is generally parallel to and beside the ramp 16 when in the non-actuating position illustrated in FIGS. 1 and 4. A crank arm 48 is connected to the rod 44 and engages the cam 20 for rotating the cam 20 upon movement of the handle 42 from the non-actuation position to the position illustrated in FIG. 3.

The cam 20 has a peripheral configuration for coacting with the roller 38 so that the lift means 22 will pivot the ramp 16 from the cross traffic position illustrated in FIG. 4 toward the vertical stored position illustrated in FIG. 3 when the handle 42 is moved to the position illustrated in FIG. 3 to rotate the cam from the first position illustrated in FIG. 4 to a second position illustrated in FIG. 3. The lift means 22, however, allows the ramp 16 to remain in the cross traffic position when the cam 20 is in the first position illustrated in FIG. 4. The peripheral configuration of the cam 20 may vary depending upon the size of the ramp 16, the strength of the springs 32, etc. As illustrated, the cam 20 has first and second extremities 50 and 52 respectively as illustrated in FIG. 3. The second extremity 52 is closed to the pivotable connection 18 between the ramp and support structure than the first extremity 50. The crank arm 48 is engageable with the cam 20 in rotating the cam 20 from the first position illustrated in FIG. 4 toward the second position illustrated in FIG. 3 to rotate the first extremity 50 in an arcuate direction away from the ramp 16. This is an important feature because the angle of inclination of the cam surface which the roller 38 engages when the ramp is in the cross traffic position determines whether or not the lift means 22 can pivot the ramp 16 upwardly. Depending upon the strength of the springs 32 and the size of the ramp 16, etc., the lift means will pivot the ramp upwardly as the surface of the cam 20 which contacts the roller rotates in a counterclockwise direction, as viewed in FIG. 4, so that the surface contacting the roller moves toward a position to increase the wedging action which urges the roller toward the support structure 14. In other words, the surface engaging the roller, as viewed in FIG. 4, must be moved in the direction toward the horizontal so as to decrease the wedging effect urging the roller to move away from the support structure 14 and thereby does, in fact, increase the wedging effect to urge the roller toward the support structure 14. This always occurs when the first extremity 50 of the cam 20 moves away from the ramp 16. As illustrated, the cam 20 is pivotably connected to the ramp intermediate the extremities 50 and 52 and has a generally V-shape extending between the extremities 50 and 52 for engaging the lift means. One side of the V-shape is engaged by the roller 38 when the ramp is in the dock level position, as illustrated in FIG. 4, and as the ramp is pivoted upwardly toward the vertical stored position, the roller 38 moves along the other portion of the V-shape of the cam 20.

The dockboard 10 also includes a lip 54 which is connected to the ramp 16 for pivotable movement relative thereto between an extended cantilevered position, as illustrated, and a pendent position disposed at 90 degrees to the ramp 16. There is also included an over center means comprising the rod 56, the spring 58 and the link 60 for biasing the lip 54 and holding the lip 54 in the extended cantilevered position and for moving over center to hold the lip in the pendent position. In other words, the lip 54 may be manually moved to compress the spring 58 and as the lip 54 reaches the pendent position where it is disposed substantially at 90 degrees to the ramp 16, the rod 56 and the link 60 move over center so that the spring 58 then acts to hold the lip in the pendent position.

There are also included support arms 62 which are slidably supported on the ramp 16 in the housings 64 for sliding movement between a retracted position, as illustrated, whereat the arms are generally coextensive with the ramp 16, and an extended position, whereat the arms 62 extend from the ramp for engaging the bed of the vehicle adjacent the ramp. The turn screws 66 threadedly extend through the housings 64 and may be tightened against the arms 62 to prevent the arms 62 from sliding relative to the housings 64. It is frequently desirable to utilize the ramp 16 for end loading a vehicle; that is, a vehicle that is loaded right to the end of the bed, and such arms are useful. In such a case, the lip 54 may be moved to the pendent position as the arms 62 are extended to rest upon the bed of the vehicle to allow traffic to move between the vehicle and the dock 12.

Figure 5:
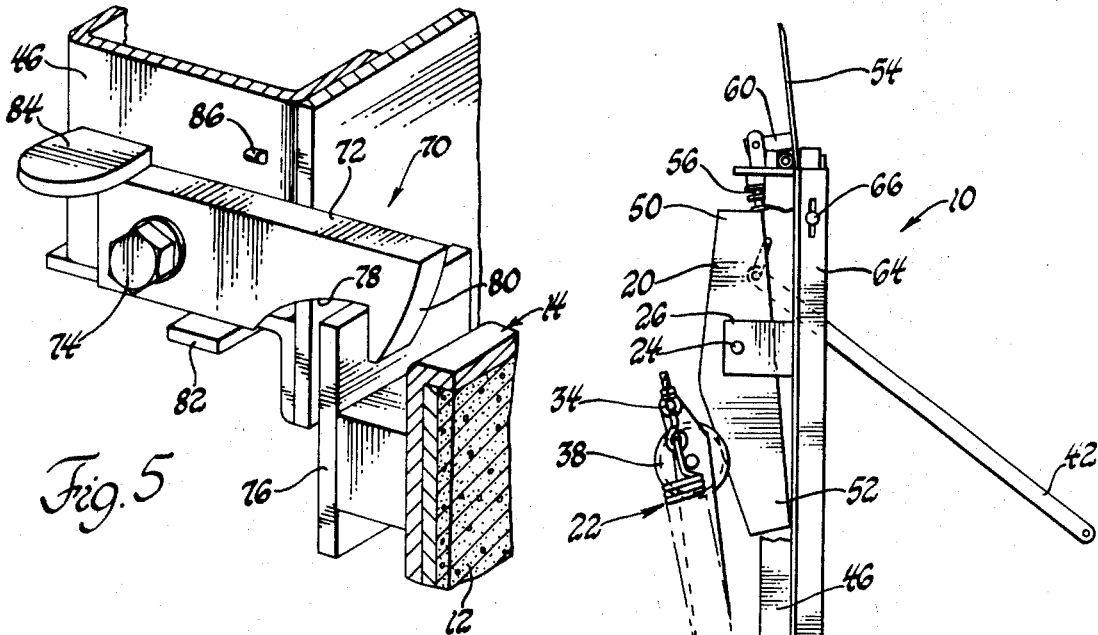
FIG. 5 is an enlarged fragmentary perspective view of the latch means utilized to lock the ramp in the vertical position.

In addition, there is included a latch means generally indicated at 70 for locking the ramp in a generally vertical raised position when in the latched position, as shown in FIGS. 3 and 5 and operable to an unlatched position as shown in FIG. 4 to allow the ramp to pivot. The latch means 70 comprises a latch link 72 rotatably connected by the stud 74 between the first and second ends thereof to the side most strengthening beam 46 of the ramp. An abutment 76 is supported by the support structure 14. The latch link 72 has a catch recess 78 adjacent the first end thereof for latching engagement with the abutment 76 as best illustrated in FIG. 5. The first end of the latch link is rounded as shown at 80 so that as the latch link 72 hits the abutment 76, it is forced to rotate upwardly and then falls into latching engagement with the abutment 76 as illustrated in FIG. 5. If necessary, a spring may be disposed about the stud 74 to coact with the latching link 72 to urge the latching link 72 to rotate against the lower stop 82. There is also included a pad 84 welded or otherwise secured to the second end of the latch link for rotating the link out of latching engagement with the abutment 76. An upper stop 86 is disposed on the strengthening beam 46 to limit upward pivoting movement of the latch link 72.

The invention has been described in an illustrative manner and it is to be understood that the terminology which has been used is intended to be in the nature of words of description rather than of limitation.

Obviously, many modifications and variations of the present invention are possible in light of the above teachings.

It is, therefore, to be understood that within the scope of the appended claims, the invention may be practiced otherwise than as specifically described.

The embodiments of the invention in which an exclusive property or privilege is claimed are defined as follows:

1. A dockboard for a loading dock comprising; a support structure, a ramp structure pivotally connected to said support structure for movement between a raised position and a cross traffic position, a cam rotatably attached to one of said structures, and lift means operatively connected to the other of said structures and engaging said cam for applying a force to said cam to pivot said ramp structure, and actuation means supported by said ramp structure and including a manually graspable handle for rotating said cam between a first position where the force applied by said lift means is insufficient to pivot said ramp structure from the cross traffic position and a second position where the force applied by said lift means is sufficient to pivot said ramp structure upwardly from the cross traffic position.

2. A dockboard as set forth in claim 1 wherein said cam has a peripheral configuration for coacting with said lift means so that said lift means will pivot said ramp structure from said cross traffic position toward said raised position when said actuation means rotates said cam from said first position to said second position and allows said ramp structure to remain in said cross traffic position when said cam is in said first position.

3. A dockboard as set forth in claim 2 wherein said cam is rotatably supported on said ramp structure and said lift means is pivotally connected to said support structure.

4. A dockboard as set forth in claim 3 wherein said cam has first and second extremities and said second extremity is closer to the pivotal connection of said ramp structure to said support structure than said first extremity, said actuation means engageable with said cam in rotating the latter from said first position to said second position so as to rotate said first extremity in an arcuate direction away from said ramp structure.

5. A dockboard as set forth in claim 4 wherein said cam is pivotally connected to said ramp structure intermediate said extremities thereof and has a generally V-shape extending between said extremities for engaging said lift means.

6. A dockboard as set forth in claim 4 wherein said actuation means comprises a rod rotatably supported by said ramp structure and extending between one side thereof and said cam, said handle being attached to said rod and extending transversely thereto.

7. A dockboard as set forth in claim 6 wherein said handle is generally parallel to and beside said ramp structure in the non-actuating position.

8. A dockboard as set forth in claim 7 including a crank arm connected to said rod and for engaging said cam for rotating the latter upon movement of said handle from said non-actuating position.

9. A dockboard as set forth in claim 8 wherein said cam is pivotally connected to said ramp structure intermediate said extremities thereof and has a generally V-shape extending between said extremities for engaging said lift means.

10. A dockboard as set forth in claim 9 wherein said lift means includes a lift arm, springs connected at one end to said lift arm and with the other end connected adjacent the pivotal connection between said ramp structure and said support structure, a roller rotatably supported by said lift arm and engaging said cam.

11. A dockboard as set forth in claim 10 including a lip connected to said ramp structure for pivotal movement relative thereto between an extended cantilevered position and a dependent position, over center means for biasing said lip toward and holding said lip in said extended cantilevered position and for moving over center to hold said lip in said dependent position.

12. A dockboard as set forth in claim 11 including support arms slidably supported on said ramp structure for sliding movement between a retracted position whereat said arms are generally coextensive with said ramp structure, and an extended position, whereat said arms extend from said ramp structure for engaging the bed of a vehicle adjacent said ramp structure.

13. A dockboard as set forth in claim 1 wherein said ramp structure is generally vertical when in said raised position and including latch means for locking said ramp structure in said raised position when in a latched position and operable to an unlatched position to allow said ramp structure to pivot.

14. A dockboard as set forth in claim 13 wherein said latch means comprises a latch link rotatably connected between first and second ends thereof to said ramp structure, an abutment supported by said support structure, said link having a catch recess adjacent the first end thereof for latching engagement with said abutment.

15. A dockboard as set forth in claim 14 wherein said latch link includes a pad adjacent the second end thereof for rotating said link out of latching engagement with said abutment.

References Cited

UNITED STATES PATENTS

| | | | |
|---|---|---|---|
| 3,006,008 | 10/1961 | Loomis et al. | 14—71 |
| 3,327,335 | 6/1967 | Beckwith et al. | |

JACOB L. NACKENOFF, Primary Examiner